(12) United States Patent
Tronconi et al.

(10) Patent No.: US 7,672,806 B2
(45) Date of Patent: Mar. 2, 2010

(54) DISPLACEMENT DETECTION DEVICE FOR A PORTABLE APPARATUS

(75) Inventors: Michele Tronconi, San Martino Siccomario (IT); Enrico Chiesa, Besozzo (IT); Fabio Pasolini, San Martino Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 91 days.

(21) Appl. No.: 11/291,080

(22) Filed: Nov. 30, 2005

(65) Prior Publication Data
US 2006/0213267 A1 Sep. 28, 2006

(30) Foreign Application Priority Data
Dec. 1, 2004 (IT) .................. TO2004A0847

(51) Int. Cl.
*G01P 15/18* (2006.01)
(52) U.S. Cl. .................. 702/141; 345/156; 73/514.35
(58) Field of Classification Search ............. 73/514.01, 73/514.35; 340/669; 702/141; 345/156
See application file for complete search history.

(56) References Cited

U.S. PATENT DOCUMENTS

| | | | | |
|---|---|---|---|---|
| 5,426,595 A | * | 6/1995 | Picard | 702/187 |
| 5,506,775 A | * | 4/1996 | Tsurushima et al. | 701/45 |
| 5,598,187 A | * | 1/1997 | Ide et al. | 345/158 |
| 6,072,467 A | * | 6/2000 | Walker | 345/157 |
| 6,343,242 B1 | * | 1/2002 | Nomura et al. | 700/245 |
| 6,661,346 B1 | * | 12/2003 | Wood et al. | 340/601 |
| 6,856,327 B2 | * | 2/2005 | Choi | 345/684 |

OTHER PUBLICATIONS

B. Vigna et al., A low-g 3 asix accelerometer for emerging automotive applications, AMAA, 2004, 12 pages.

\* cited by examiner

*Primary Examiner*—John E Chapman
(74) *Attorney, Agent, or Firm*—Lisa K. Jorgenson; E. Russell Tarleton; Seed IP Law Group PLLC

(57) ABSTRACT

In a displacement detection device, an acceleration sensor generates at least a first acceleration signal relating to an axis of detection, and a displacement detection circuit is connected to the acceleration sensor has a comparator stage for comparing the acceleration signal with a programmable acceleration threshold and generates a displacement-detection signal. A high-pass filter is arranged between the acceleration sensor and the comparator stage so as to reduce a DC component of the acceleration signal. The cut-off frequency of the high-pass filter is modified according to the type of displacements that are to be detected.

24 Claims, 4 Drawing Sheets

DISPLACEMENT DETECTION DEVICE FOR A PORTABLE APPARATUS

BACKGROUND OF THE INVENTION

1. Field of the Invention

The present invention relates to a displacement detection device for a portable apparatus and, more particularly, to a device that simplifies the user interface of the portable apparatus.

2. Description of the Related Art

As is known, in the last few years, with the increasing use of portable electronic devices (such as laptops, Personal Data Assistants (PDAs), digital audio players, cellphones, digital video cameras, and the like), the need has arisen to simplify the use of such devices and, in particular, to simplify the user interface. In this regard, of particular interest is the possibility of activating given functions or programs of the portable devices with a simple movement imparted thereon by the user. Consider, for example, navigation within a list of options or an address book of a cellphone by simply tilting it or moving it in the direction in which is it is desired to scroll the list or the address book, or again to the possibility of adapting the display of an image on a PDA by simply changing the physical orientation, such as the inclination thereof.

In some portable devices it has been proposed to integrate a displacement detection device, which enables activation of functions or programs upon detection of a movement imparted by the user.

Displacement detection devices of a known type generally include an accelerometer of a linear type, which can be manufactured using the semiconductor technology (so-called MEMS, or micro-electro-mechanical systems). The linear accelerometer is used for measuring the accelerations acting on the portable apparatus so as to determine, with an appropriate conditioning electronics, the direction in which the portable apparatus has been displaced.

As is known, and shown in FIG. 1, a linear accelerometer 1 of a MEMS type includes a sensing element 2, which detects acceleration and generates an electrical signal correlated to the detected acceleration, and a conditioning electronics for conditioning the electrical signal, which generates an output signal. $V_{out}$ and typically includes a charge integrator 3 and a gain and noise-cancellation stage 4, which uses, for example, the correlated-double-sampling (CDS) technique in order to eliminate the noise.

As shown in detail in FIG. 2, the sensing element 2 includes a stator, of which only first and second fixed electrodes 5a, 5b are shown, and a rotor, made up of a mobile mass 6 and mobile electrodes 7 fixed to the mobile mass 6. Each mobile electrode 7 is arranged between a respective first fixed electrode 5a and a respective second fixed electrode 5b. The mobile mass 6 is suspended via springs 10 to anchorage elements 11.

The mobile mass 6 can move along an axis 13 that constitutes the preferential axis of detection of the linear accelerometer 1.

As shown in FIG. 3, the sensing element 2 can be schematically represented as a first capacitor $C_1$ and a second capacitor $C_2$ arranged in series, the capacitances of which are variable as a function of the distance between the mobile electrodes 7 and the fixed electrodes 5a, 5b, and hence as a function of the displacement of the rotor with respect to the stator. In particular, the first capacitor $C_1$ is formed by the set of the first fixed electrodes 5a and by the set of the mobile electrodes 7, whilst the second capacitor $C_2$ is formed by the set of the second fixed electrodes 5b and by the set of the mobile electrodes 7.

When the linear accelerometer 1 is subjected to an acceleration along the axis 13, the mobile mass 6 moves along said axis, and it consequently produces a capacitive unbalancing between the first capacitor $C_1$ and the second capacitor $C_2$. This capacitive unbalancing is detected by the conditioning electronics, which then supplies at an output the signal $V_{out}$.

In particular, the displacement of the mobile mass 6 arises even in the presence of a static acceleration (for example, the acceleration of gravity), generating a corresponding capacitive unbalancing, which is detected by the conditioning electronics. Accordingly, even in a rest condition, a non-zero acceleration is detected, having a value equal to that of the component of the acceleration of gravity along the axis 13.

Since in general it is desired to determine the displacements of the portable apparatus along three axes (corresponding to the three axes x, y and z of a set of Cartesian axes fixed with respect to the portable apparatus), the displacement detection device generally has three uniaxial linear accelerometers, each of which detects the component of the acceleration acting on the portable apparatus along one direction of detection. Alternatively, in an equivalent way, a single accelerometer provided with three axes of detection may be envisaged. In any case, three acceleration signals $A_x$, $A_y$ and $A_z$ are generated, which represent the component of the acceleration along the x, y, and z axis, respectively.

The displacements of the portable apparatus are then determined by an appropriate processing circuit, which processes the acceleration signals $A_x$, $A_y$ and $A_z$, and in particular compares them with respective fixed acceleration thresholds. Exceeding of one of the acceleration thresholds indicates that the portable apparatus has undergone a displacement in the corresponding direction.

As previously described, due to the acceleration of gravity, the accelerometers have a non-zero output even in the absence of any acceleration imparted by the user on the portable apparatus. In particular, the acceleration signals $A_x$, $A_y$ and $A_z$ due to the sole acceleration of gravity have different values according to the inclination of the portable apparatus, in so far as the components of the acceleration of gravity along the axes x, y and z, respectively, differ each time. Consequently, exceeding of the acceleration thresholds by the acceleration signals $A_x$, $A_y$ and $A_z$, in the presence of an acceleration imparted on the portable apparatus, depends upon the initial position (and in particular upon the orientation) of the portable apparatus.

This phenomenon entails disparity of operation according to the initial resting position of the portable apparatus, as determined by the user. Furthermore, this problem is aggravated by the fact that each user has a personal way of holding a portable apparatus, and the differences increase, for example, between right-handed users and left-handed users.

To solve the aforesaid problem, it has been proposed to set, in an initial step prior to displacement measurements, a reference position, corresponding to the resting position of the portable apparatus, and then to refer the detected displacements to said reference position, in a differential manner. A circuit diagram of a processing circuit implementing this solution is shown in FIG. 4.

In detail, the processing circuit, designated by 20, comprises three registers 14-16, three adders 17-19, and three threshold comparators 21-23. The registers 14-16 receive at input a respective acceleration signal $A_x$, $A_y$ and $A_z$ from an accelerometer 25, and store an initial value thereof. The adders 17-19 each receive at input a respective acceleration signal $A_x$, $A_y$ and $A_z$ and the output of a respective register 14-16. The three threshold comparators 21-23 receive at input the signal outputted by a respective adder 17-19, compare it with an acceleration threshold $A_{th}$, and supply at output a respective logic signal that is the result of the comparison. This logic signal represents detection of a significant acceleration along the corresponding axis. The acceleration threshold $A_{th}$ is stored in a dedicated threshold register 25.

Following an appropriate external initialization command (designated by INIT in FIG. 4), the initial values of the acceleration signals $A_x$, $A_y$ and $A_z$ in the resting position of the portable apparatus are stored in the registers 14, 15 and 16 (these initial values will be used as reference values). Then, the reference values stored in the respective register are subtracted from the acceleration signals $A_x$, $A_y$ and $A_z$ each time detected by the accelerometer 25. In this way, the variation of the respective acceleration signal $A_x$, $A_y$ and $A_z$ with respect to the resting position is provided at input to the threshold comparators 21, 22, 23, and hence the displacement detection does not (in theory) depend upon the initial position (i.e., upon the acceleration of gravity), but only upon the displacements imparted on the portable apparatus.

A drawback of the described processing circuit 20 is linked to the fact that it is necessary to automatically determine when new reference values are to be set in the registers 14, 15 and 16. Furthermore, once the reference position has been established, the user must maintain the portable apparatus in said position to ensure correct operation of the displacement detection device. In fact, the described circuit is not able to adapt automatically to the change of posture of the user, including for example the inevitable (in so far as involuntary) movements of the wrist that cause a variation in the portable apparatus orientation. Furthermore, in the worst case (i.e., when said involuntary movements are greater than the acceleration threshold), the involuntary movements could trigger an undesirable activation event. It is, consequently, evident that a solution of this type actually makes unnatural the use of functions activated by movement, which instead should simplify the man-machine interface.

Another proposed solution envisages setting the acceleration threshold each time the portable apparatus is displaced. This solution is, however, far from practicable, unless high computing power is available.

BRIEF SUMMARY OF THE INVENTION

The disclosed embodiments of the present invention provide a displacement detection device that will enable the drawbacks described above to be overcome and, in particular, that will enable detection operations to be made independent of the initial position assumed by the portable apparatus incorporating the detection device.

In accordance with one embodiment of the invention, a displacement detection device is provided that includes an acceleration sensor generating a first acceleration signal relating to a first axis of detection; and a displacement detection circuit connected to the acceleration sensor and including a first comparator stage for comparing the first acceleration signal with a first acceleration threshold and generating a first displacement detection signal, the displacement detection circuit further including a first filtering circuit arranged between the acceleration sensor and the first comparator stage and configured to reduce a DC component of the first acceleration signal.

In accordance with another aspect of the foregoing embodiment, the first filtering circuit is formed of either a high-pass filter or a proportional-integral controller or a band-pass filter.

In accordance with another aspect of the foregoing embodiment, the displacement detection circuit includes a second comparator stage for comparing the first acceleration signal with a second acceleration threshold lower than the first acceleration threshold.

In accordance with yet a further aspect of the foregoing embodiment, the first and second acceleration thresholds are settable, and the displacement detection circuit includes a first memory element storing the first acceleration threshold and a second memory element storing the second acceleration threshold.

In accordance with another aspect of the foregoing embodiment, the displacement detection circuit includes an enabling stage connected to the first comparator stage and receiving an enabling signal, the enabling stage configured to supply at an output the first displacement-detection signal when an enabling signal satisfies a given condition.

In accordance with yet another aspect of the foregoing embodiment, the acceleration sensor includes a linear accelerometer with three axes of detection further generating a second acceleration signal and a third acceleration signal, the first, second, and third acceleration signals relating to a component of acceleration along a respective axis of detection; and wherein the displacement detection circuit further includes a second comparator stage and a third comparator stage for comparing, respectively, the second and third acceleration signals with the first acceleration threshold and generating a second displacement-detection signal and a third displacement-detection signal; and a second and third filtering circuit arranged, respectively, between the acceleration sensor and the second and third comparator stages and configured to reduce a DC component, respectively, of the second acceleration signal and of the third acceleration signal.

In accordance with yet another aspect of the foregoing embodiment, a microprocessor is provided that is connected to the displacement detection circuit, and the acceleration sensor, the displacement detection circuit, and the microprocessor are integrated in a single chip.

In accordance with another embodiment of the invention, a method for detection of the displacement of a portable apparatus is provided. The method includes detecting at least a first acceleration signal correlated with the acceleration of the portable apparatus along a first axis of detection; comparing the first acceleration signal with a first acceleration threshold; generating a first displacement-detection signal based on the comparison between the first acceleration signal and the first acceleration threshold; and attenuating by filtering a DC component of the first acceleration signal before comparing the first acceleration signal with the first acceleration threshold.

In accordance with another aspect of the foregoing embodiment, the method further includes modifying a cut-off frequency associated with the attenuating by filtering, the modifying the cut-off frequency carried out before the attenuating by filtering.

In accordance with another aspect of the foregoing embodiment, the modifying includes selecting a mode of operation chosen between at least a first mode associated with fast movements of the portable apparatus, and a second mode associated with slow movements of the portable apparatus, the modifying step further including increasing the cut-off frequency in the first mode and decreasing the cut-off frequency in the second mode.

In accordance with another aspect of the foregoing embodiment, the method further includes detecting a second acceleration signal and a third acceleration signal correlated with the acceleration of the portable apparatus along a second axis of detection and a third axis of detection, respectively; attenuating by filtering a DC component of the second acceleration signal and of the third acceleration signal; and after attenuating by filtering, comparing the second acceleration signal and the third acceleration signal with the first acceleration threshold for generating, respectively, a second displacement-detection signal and a third displacement-detection signal.

In accordance with another embodiment of the invention, a circuit is provided that includes an input circuit receiving an external acceleration signal and generating therefrom a filtered acceleration signal having a reduced DC component; a detection circuit receiving the filtered acceleration signal and further receiving a threshold signal and generating in response thereto a detection signal; and a microprocessor receiving the detection signal and generating in response thereto an actuation signal.

In accordance with a further embodiment of the invention, a circuit for processing an acceleration signal is provided, the circuit including an input circuit configured to receive an external acceleration signal and to generate a filtered acceleration signal; a first threshold signal circuit configured to store and output a first threshold signal; a comparator circuit configured to receive the filtered acceleration signal and the first threshold signal and to output a detection signal; and an enabling circuit configured to receive the detection signal and an external enabling signal and to generate a logic signal in response thereto.

In accordance with another aspect of the foregoing embodiment, the circuit further includes a plurality of input circuits, each configured to receive an external acceleration signal corresponding to a different direction of acceleration, and a plurality of comparator circuits each receiving as input the first threshold signal and a respective one of the plurality of acceleration signals; a plurality of enable circuits each configured to receive a detection signal from a respective comparator circuit and to further receive a respective external enabling signal and to output a logic signal corresponding to the respective acceleration signal.

BRIEF DESCRIPTION OF THE SEVERAL VIEWS OF THE DRAWINGS

For a better understanding of the present invention, a preferred embodiment thereof is now described, purely by way of non-limiting example and with reference to the attached drawings, wherein.

DETAILED DESCRIPTION OF THE INVENTION

Figure 1:
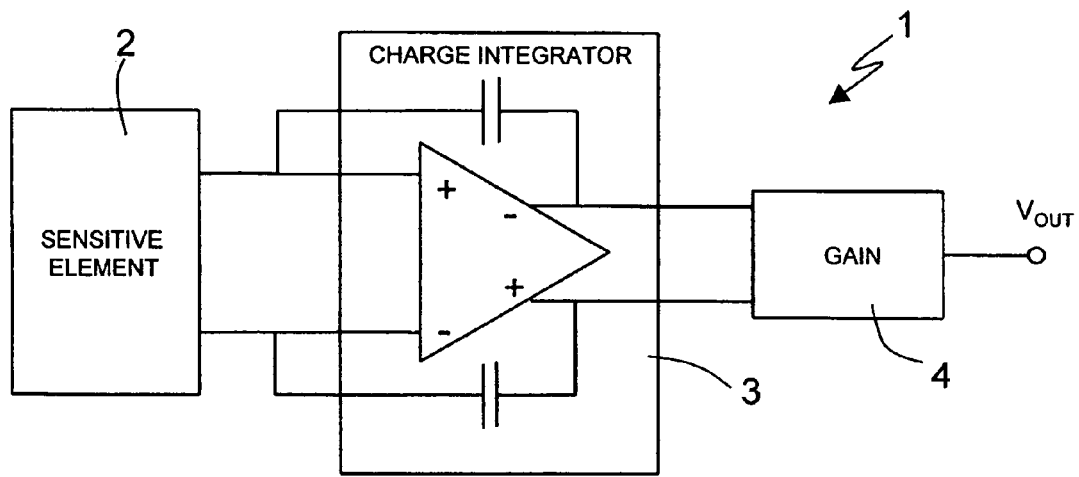
FIGS. 1-3 are schematic representations of a linear accelerometer of a known type.
Figure 2:
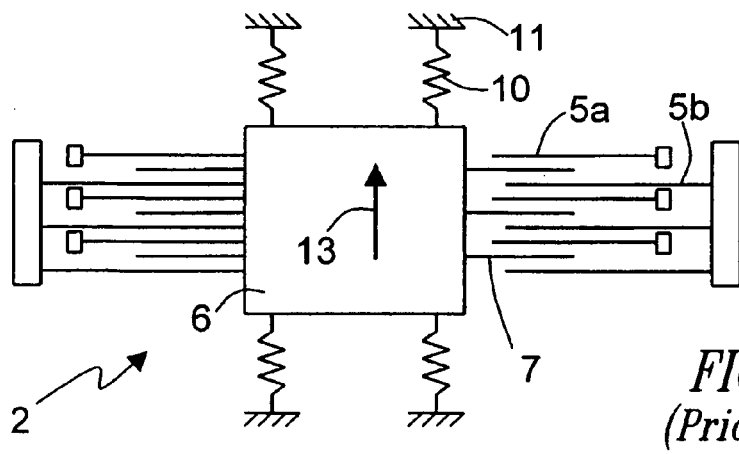
Figure 3:
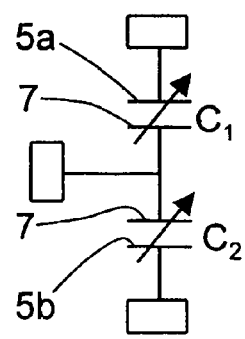
Figure 4:
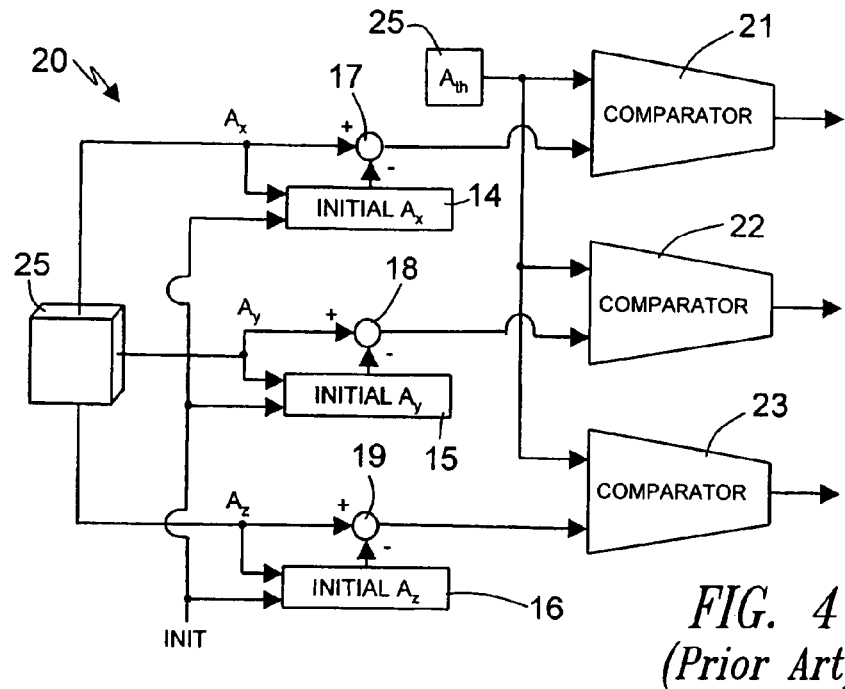
FIG. 4 shows a circuit diagram of a displacement detection circuit of a known type.
Figure 5:
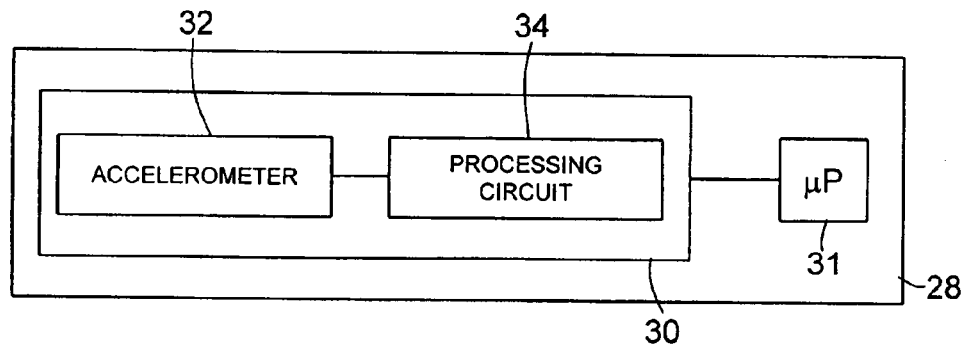
FIG. 5 shows a block diagram of a portable apparatus incorporating a displacement detection device.

FIG. 5 is a schematic illustration of a portable apparatus 28 provided with a displacement detection device 30 and with a microprocessor 31 in accordance with one embodiment of the invention. The displacement detection device 30 includes an accelerometer 32 of a linear type, and a processing circuit 34. In particular, the accelerometer 32 and the processing circuit 34 are integrated in a single chip.

The accelerometer 32 is of a known type. In one embodiment, it is a MEMS device made with the semiconductor technology and has three axes of detection x, y and z so as to generate three acceleration signals $A_x$, $A_y$ and $A_z$. Each acceleration signal is correlated to the acceleration detected along a respective axis of detection. For example, the accelerometer 32 can be realized as described in "A low-g 3 axis digital output accelerometer for emerging automotive applications", B. Vigna, et al., AMAA 2004.

The processing circuit 34 receives at input the acceleration signals $A_x$, $A_y$ and $A_z$, performs appropriate processing operations, and supplies at an output the logic signals corresponding to the displacements of the portable apparatus from the reference position.

The microprocessor 31 receives the logic signals and determines the direction in which the portable apparatus 28 has moved so as to activate corresponding functions or programs.

For convenience of illustration, the processing circuit 34 will now be described with reference to a single axis of detection (such as the axis x, not shown) along which the displacements of the portable apparatus 28 are detected. The processing circuits corresponding to axes y and z have in any case the same structure.

Figure 6:
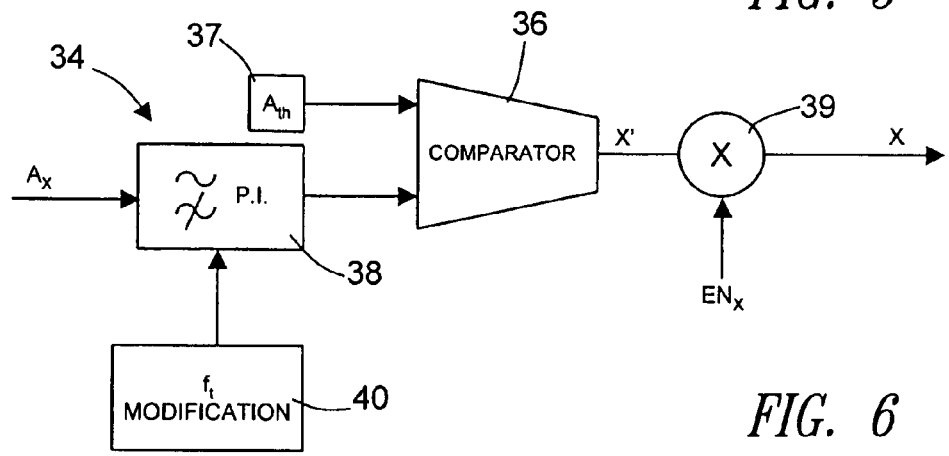
FIG. 6 shows a first embodiment of a processing circuit of the displacement detection device of FIG. 5.

The processing circuit 34 (see FIG. 6) comprises a threshold comparator 36, a first register 37 storing an acceleration threshold $A_{th}$, a high-pass filter 38, receiving at input the acceleration signal $A_x$ from the accelerometer 32 (not shown in FIG. 6), and an enabling stage 39. The high-pass filter 38 can, for example, be realized via a PI (proportional-integral) controller.

In detail, the threshold comparator 36 has a first input connected to the first register 37, a second input connected to the output of the high-pass filter 38, and an output connected to the enabling stage 39. The enabling stage 39, preferably comprising logic gates, has a first input connected to the output of the threshold comparator 36, a second input receiving an enabling signal $EN_x$ of a logic type, and an output connected to the microprocessor 31 (FIG. 5).

The processing circuit 34 further comprises a modification stage 40, which is connected to the high-pass filter 38 and has the purpose of modifying the cut-off frequency $f_t$ of the high-pass filter 38, on the basis of a selection by a user.

Operation of the processing circuit 34 is described below.

The acceleration signal $A_x$ generated by the accelerometer 32 is filtered in the high-pass filter 38 and supplied to the threshold comparator 36, which first calculates its absolute value and then compares it with the acceleration threshold $A_{th}$, generating at output a logic signal (designated by X'). The logic signal X' has, for example, a high value, in the case where the absolute value of the acceleration signal $A_x$ is higher than the acceleration threshold $A_{th}$ (a situation corresponding to the detection of an acceleration greater than the threshold set along the axis x). The acceleration threshold $A_{th}$ is settable by the user, by writing in the first register 37.

When the enabling signal $EN_x$ assumes a pre-set logic value, for example high, the enabling stage 39 supplies at output a displacement-detection signal X corresponding to the logic signal X' received by the threshold comparator 36. Otherwise, the enabling stage 39 supplies at output a pre-set logic signal, for example low, actually disabling detection of displacements along the axis x. This function is useful for disabling one or more of the axes of detection and hence simplifying the processing by the microprocessor 31, in the case where the direction of displacement of the portable apparatus 28 is known with certainty. In any case, the displacement-detection signal X is sent to the microprocessor 31, which processes it (possibly together with the displacement-detection signals Y and Z corresponding to the other axes of detection y and z) to determine the direction of displacement of the portable apparatus 28.

In particular, the high-pass filter 38 eliminates (or in any case reduces) the DC component (i.e., at zero-frequency) of the acceleration signal $A_x$ received at input due to the acceleration of gravity, so that detection of displacement is actually independent of the initial position of the portable apparatus 28. Furthermore, the modification stage 40 enables modification of the cut-off frequency $f_t$ of the high-pass filter 38 so as to adapt operation of the processing circuit 34 to the type of application/function that it is desired to provide. For example, if it is desired to detect slow movements made by the user, it will be necessary to select a sufficiently low cut-off frequency $f_t$ in such a way that the low-frequency components of the corresponding acceleration signals will have an amplitude sufficient to be detected. A higher cut-off frequency $f_t$ will, instead, be selected in the case where the movements of the user are faster.

In the described processing circuit 34, an acceleration signal $A_x$ close to the acceleration threshold $A_{th}$ causes continual detections of exceeding of the threshold and multiple switching of the displacement-detection signal X.

In order to prevent the above situation, according to a further aspect of the present invention, it is proposed to use two different acceleration thresholds, an external acceleration threshold $A_{th\_e}$ and an internal acceleration threshold $A_{th\_i}$, which is lower than the external acceleration threshold $A_{th\_e}$, so as to perform a displacement detection with hysteresis.

Figure 7:
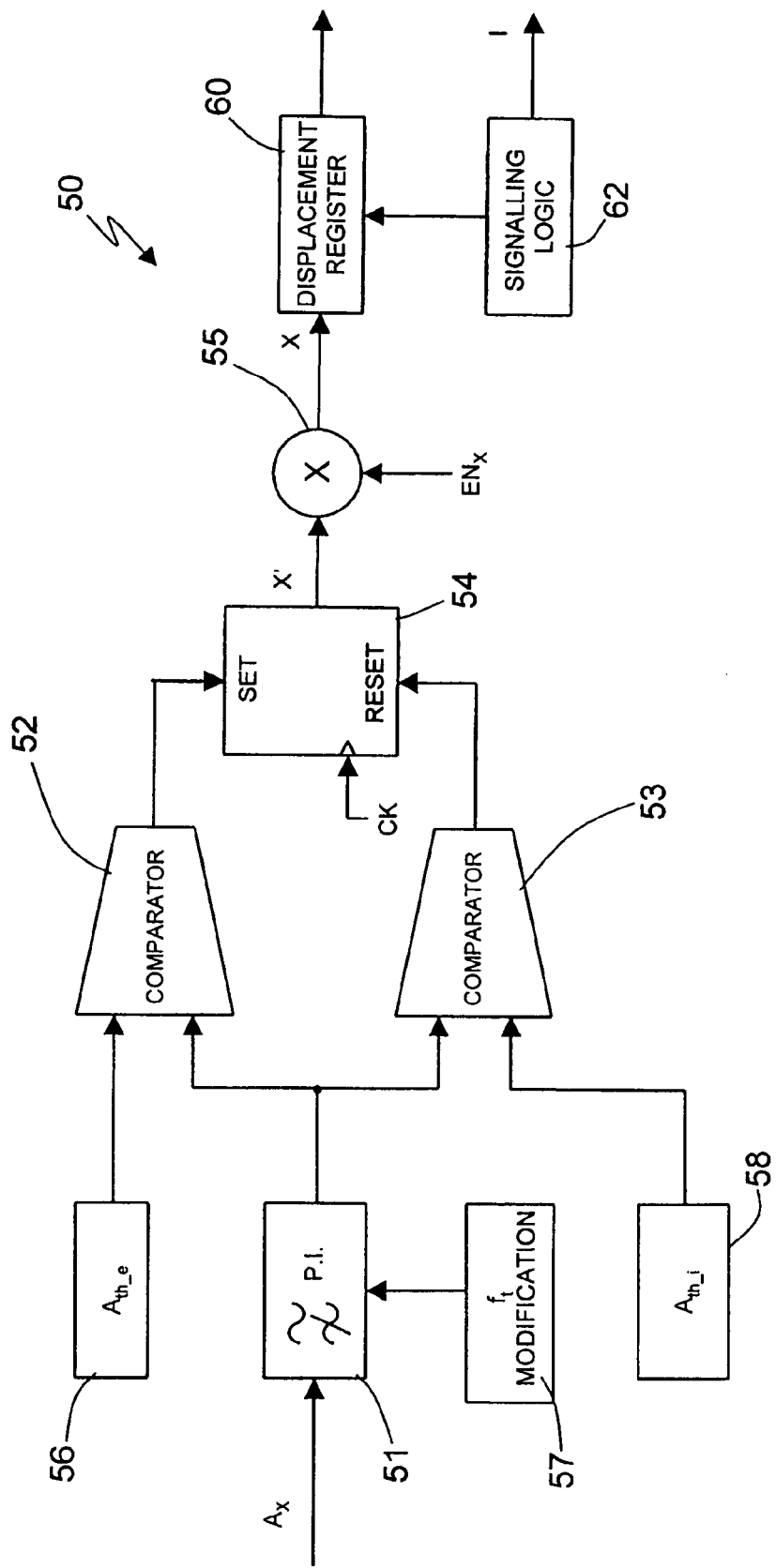
FIG. 7 shows a second embodiment of the processing circuit of FIG. 6.

The processing circuit 50 shown in FIG. 7 implements this functionality.

In detail, the processing circuit 50 includes a high-pass filter 51, a first threshold comparator 52 and a second threshold comparator 53, a set/reset register 54, a modification stage 57 connected to the high-pass filter 51, and an enabling stage 55. The high-pass filter 51, each of the threshold comparators 52, 53, the modification stage 57, and the enabling stage 55 are equivalent to the corresponding elements described in connection with FIG. 6.

In the specific case, the first threshold comparator 52, in addition to being connected to the output of the high-pass filter 51, is connected to a first register 56, which stores the external acceleration threshold $A_{th\_e}$. The second threshold comparator 53, in addition to being connected to the output of the high-pass filter 51, is connected to a second register 58, which stores the internal acceleration threshold $A_{th\_i}$.

The result of the comparisons executed by the first and second threshold comparators 52, 53 is supplied to the set input and reset input, respectively, of the set/reset register 54 which, in a per se known manner, also receives a clock signal CK. The output of the set/reset register 54 is connected to the enabling stage 55.

The processing circuit 50 further includes a displacement register 60, which is connected to the output of the enabling stage 55, and a signaling logic 62, which is connected to the displacement register 60.

Operation of the processing circuit 50 is described hereinafter.

When the absolute value of the acceleration signal $A_x$ is greater than the external acceleration threshold $A_{th\_e}$, the output of the first threshold comparator 52 assumes a high logic value, and sets in a set condition the set/reset register 54, the output of which consequently also assumes the high logic value. Then, only when the acceleration signal $A_x$ falls below the internal acceleration threshold $A_{th\_i}$, the output of the second threshold comparator 53 assumes a high logic value and sets in a reset condition the set/reset register 54, the output of which switches to the low logic value. Accordingly, the oscillations of the displacement-detection signal X are eliminated. Through the enabling stage 55 and the enabling signal $EN_x$ it is again possible to disable detection of displacements along the axis x.

The displacement register 60 has the purpose of storing the displacement-detection signal X. Preferably, when also displacements along the axes y and z are detected, the displacement register 60 is single, and stores also the displacement-detection signals Y and Z. The microprocessor 31 can then read periodically the contents of the displacement register 60, for example via a serial interface, and process the displacement-detection signal X (and possibly the displacement-detection signals Y and Z) to determine the direction of displacement of the portable apparatus 28.

Furthermore, the signaling logic 62 has the purpose of controlling the contents of the displacement register 60 and issuing an interrupt signal I for the microprocessor 31 when a variation in the data stored in the displacement register 60 occurs, so as to signal to the microprocessor 31 the need to perform a new reading. Once the microprocessor 31 has performed said reading, the signaling logic 62 disables the interrupt signal I, which remains disabled until a new change in the data stored in the displacement register 60 occurs.

The described displacement detection device has the following advantages.

First, it makes it possible to disregard the value of the DC component of the acceleration, for example due to the acceleration of gravity, and to assess the amplitude of the sole movements made by the user. In this way, it is in effect a constant resetting of the reference position, starting from which the displacements of the portable apparatus are to be detected.

The possibility of modifying the cut-off frequency of the high-pass filter enables adaptation of the displacement detection device to the requirements and to the type of movements of the user, as well as to the type of portable apparatus.

Furthermore, the whole displacement detection device can be integrated in a single chip, with obvious advantages in terms of savings in area occupation and of simplification of the management software of the portable apparatus.

Finally, it is clear that modifications and variations can be made to what is described and illustrated herein, without thereby departing from the scope of the present invention, as defined in the annexed claims.

Figure 8:
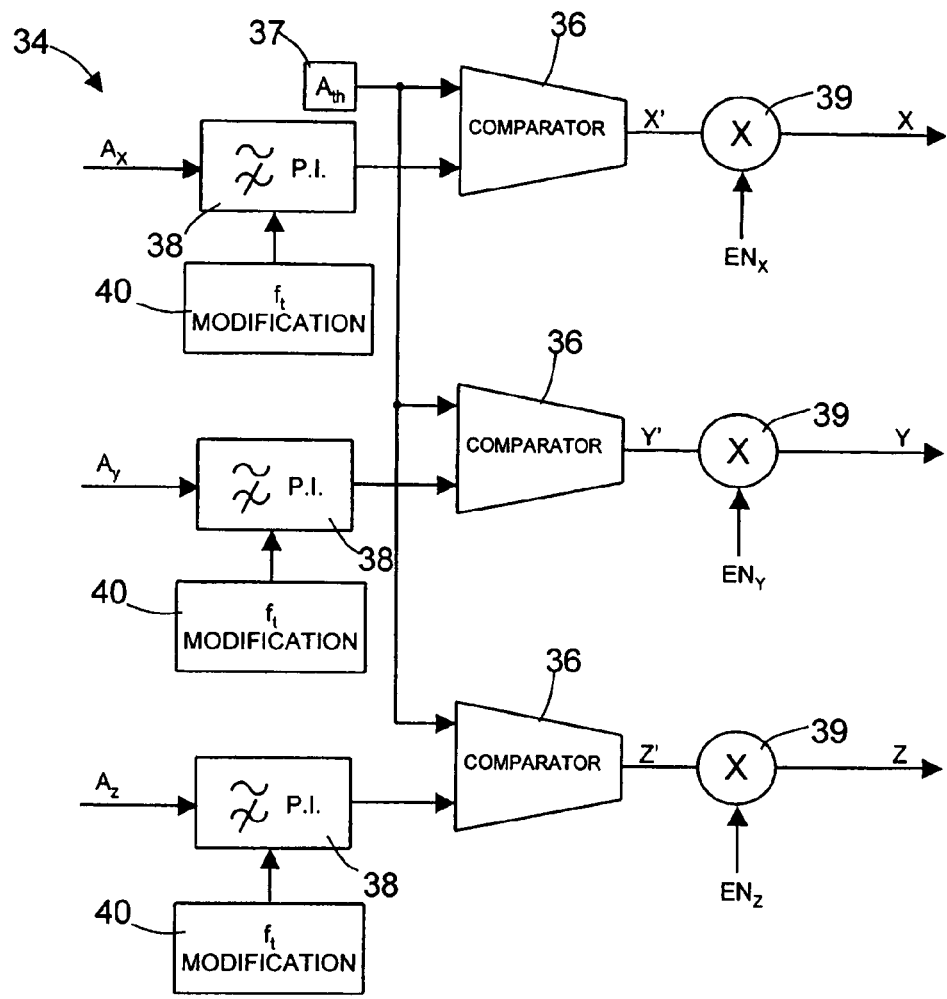
FIG. 8 shows a possible variation of the processing circuit of FIG. 6.

In particular, as previously described, the displacement detection device can detect displacements along the three axes x, y and z, as shown in FIG. 8.

Furthermore, the displacement detection device can be readily modified for detecting not only the direction of displacement of the portable apparatus, but also the sense or positive/negative movement of the displacement. In fact, it is sufficient to use two comparators that compare the raw value (instead of the absolute value) of the acceleration signal filtered by the high-pass filter, one of which with a positive acceleration threshold and the other with a negative acceleration threshold. In this way, two output logic signals are obtained, which represent exceeding of the acceleration threshold in a first sense or in a second sense of the displacement. Likewise, in the case where a displacement detection with hysteresis is performed, the processing circuit will comprise four threshold comparators, two of which are receiving positive acceleration thresholds, and the other two of which are receiving negative acceleration thresholds. Alternatively, the sense of the displacement can be recognized by the sign of the digital word at output from the accelerometer, i.e., by the value of the most significant bit.

Furthermore, instead of the high-pass filter, a band-pass filter can be provided or any circuit commonly known to persons skilled in the art for suppression (or attenuation) of the DC component of a signal.

The described displacement detection device can be used not only for the purposes of simplification of the human interface, but also for reactivating a portable apparatus from the stand-by condition (thus implementing the so-called "wake-up" function). In this case, the detection of an acceleration greater than the pre-set threshold causes reactivation of functions of the portable apparatus previously de-activated to save energy. In particular, if the threshold is selected appropriately, the small involuntary movements performed by the user keep the portable apparatus in an operative condition while it is used.

In addition, the displacement detection device can be used also in systems for control and compensation of vibrations, for example, inside electrical household appliances. In this case, in fact, it is not necessary to know the DC acceleration to which the apparatus is subjected, but rather the displacement with respect to a resting position, so as to minimize the vibrations.

Figure 9:
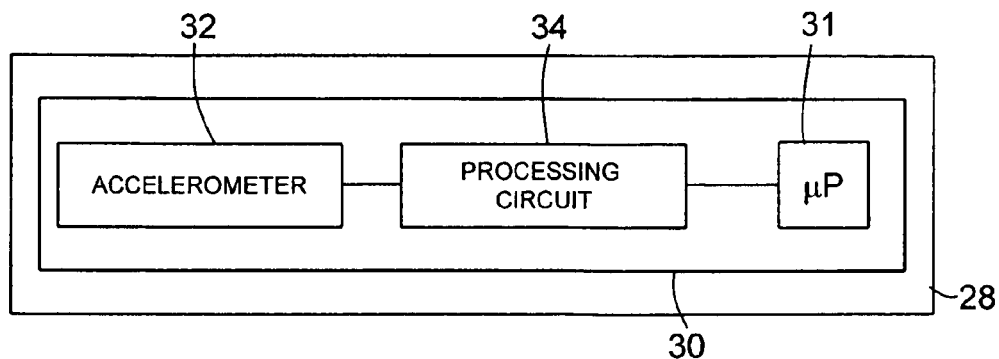
FIG. 9 shows a variation of the block diagram of FIG. 5.

Finally, in the variation shown in FIG. 9, the microprocessor 31 is integrated within the displacement detection device 30. In this way, within a single chip, all the necessary processing operations are carried out to determine the direction, and in some applications the sense or vector of the displacement of the portable apparatus.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A portable device controlled by user-imparted motion, comprising:
   a handheld portable device;
   a detection device comprising:
      an acceleration sensor generating a first acceleration signal relating to a first axis of detection in response to user-imparted motion of the handheld portable device, and
      a displacement detection circuit connected to said acceleration sensor and comprising a first comparator stage for comparing said first acceleration signal with a first acceleration threshold and generating a first displacement detection signal indicative of a displacement of the device along the first axis of detection of the acceleration sensor relative to a reference position, said displacement detection circuit further comprises first filtering means arranged between said acceleration sensor and said first comparator stage and configured to reduce a DC component of said first acceleration signal that is due to an acceleration of gravity and reset the reference position of the device, the displacement detection circuit further comprising a hysteresis memory element having a first input and a second input; said first comparator stage having an output connected to said first input, and a second comparator stage having an output connected to said second input and adapted to compare said first acceleration signal with a second acceleration threshold lower than said first acceleration threshold; and
   a microprocessor coupled to the displacement detection circuit to generate control signals to the handheld portable device.

2. The device of claim 1 wherein said first and second acceleration thresholds are settable, and said displacement detection circuit comprises a first memory element storing said first acceleration threshold and a second memory element storing said second acceleration threshold.

3. The device of claim 2 wherein said displacement detection circuit further comprises a third memory element cascaded to said first comparator stage and configured to store said first displacement-detection signal.

4. The device of claim 1 wherein said hysteresis memory element comprises a set/reset register.

5. The device of claim 1 wherein said displacement detection circuit further comprises an enabling stage connected to said first comparator stage and receiving an enabling signal, said enabling stage configured to supply at an output said first displacement-detection signal when said enabling signal satisfies a given condition.

6. The device of claim 1 wherein said acceleration sensor comprises a linear accelerometer with three axes of detection further generating a second acceleration signal and a third acceleration signal, said first, second, and third acceleration signals relating to a component of the acceleration along a respective axis of detection; and wherein said displacement detection circuit further comprises a second comparator stage and a third comparator stage for comparing, respectively, said second and third acceleration signals with said first acceleration threshold and generating a second displacement-detection signal and a third displacement-detection signal; and second and third filtering means arranged, respectively, between said acceleration sensor and said second and third comparator stages and configured to reduce a DC component, respectively, of said second acceleration signal and of said third acceleration signal.

7. The device of claim 1 wherein said acceleration sensor, said displacement detection circuit and, said microprocessor are integrated in a single chip.

8. A method for detection of user-imparted displacements of a portable apparatus and controlling the portable apparatus in response thereto, comprising:
   detecting at least a first acceleration signal correlated with the acceleration of said portable apparatus imparted by the user along a first axis of detection;
   comparing said first acceleration signal with a first acceleration threshold and comparing the first acceleration signal with a second acceleration threshold lower than the first acceleration threshold to perform displacement detection with hysteresis;
   attenuating by filtering a DC component of said first acceleration signal due to the acceleration of gravity before comparing said first acceleration signal with said first and second acceleration thresholds and resetting of the reference position;
   generating a first displacement-detection signal based on the comparison between said first acceleration signal and said first acceleration threshold and the comparison between the first acceleration signal and a second acceleration threshold that is less than the first acceleration threshold, the first displacement-detection signal indicative of displacement of the apparatus relative to a reference position; and controlling operation of the portable apparatus in response to the displacement-detection signal by generating control signals to a user interface.

9. The method of claim 8, further comprising modifying a cut-off frequency associated with said attenuating by filtering, said modifying the cut-off frequency carried out before said attenuating by filtering.

10. The method of claim 9 wherein modifying comprises selecting a mode of operation chosen between at least a first mode associated with fast movements of said portable apparatus, and a second mode associated with slow movements of said portable apparatus, said modifying step further comprising increasing said cut-off frequency in said first mode and decreasing said cut-off frequency in said second mode.

11. The method of claim 8, further comprising:
detecting a second acceleration signal and a third acceleration signal correlated with the acceleration of said portable apparatus along a second axis of detection and a third axis of detection, respectively;
attenuating by filtering a DC component of said second acceleration signal and of said third acceleration signal due to the acceleration of gravity; and
after attenuating by filtering, comparing said second acceleration signal and said third acceleration signal with said first acceleration threshold for generating, respectively, a second displacement-detection signal and a third displacement-detection signal.

12. A portable apparatus, comprising:
a displacement detection circuit, said portable apparatus chosen from the group consisting of a laptop computer, a PDA, an audio player, a cellphone, and a video camera, the displacement detection circuit comprising:
an acceleration sensor generating a first acceleration signal relating to a first axis of detection;
a displacement detection circuit connected to said acceleration sensor and comprising a first comparator stage for comparing said first acceleration signal with a first acceleration threshold and a second comparator stage for comparing the first acceleration signal with a second acceleration threshold that is lower than the first acceleration threshold and generating a first displacement detection signal indicative of a displacement of the device relative to a reference position, said displacement detection circuit further comprises first filtering means arranged between said acceleration sensor and said first comparator stage and configured to reduce a DC component of said first acceleration signal that is due to an acceleration of gravity and reset the reference position of the device, the displacement detection circuit further comprising a hysteresis memory element having a first input and a second input; said first comparator stage having an output connected to said first input, and said second comparator stage having an output connected to said second input; and
the acceleration sensor generating second and third acceleration signals relating to second and third axes of acceleration, and the displacement detection circuit generating second and third displacement detection signals and configured to reduce the DC component of the second and third acceleration signals to remove acceleration of gravity therefrom;
the portable apparatus further comprising a microprocessor connected to an output of said displacement detection circuit for determining the direction of displacement of said portable apparatus and further coupled to a user interface, the microprocessor adapted to generate control signals to the user interface based on the direction of displacement of the portable device.

13. The portable apparatus of claim 12, further comprising a threshold circuit configured to provide the first and second acceleration thresholds.

14. The circuit of claim 13 wherein the threshold circuit is configured to provide adjustment to the first and second acceleration thresholds.

15. A device, comprising:
a portable device having an electronic control circuit;
an input circuit receiving an output from an acceleration circuit that is generated in response to user-imparted motion of the portable device and generating therefrom filtered acceleration signals having a reduced DC component to filter out the acceleration of gravity and constantly resetting a reference position of the portable device;
a detection circuit receiving the filtered acceleration signals and further receiving a first threshold comparison signal and a second threshold comparison signal to perform a displacement detection with hysteresis and generating in response thereto detection signals indicating displacement of the portable device relative to the reference position of the portable device; and
a microprocessor receiving the detection signals and generating in response thereto actuation signals that are received by the electronic control circuit to control operation of the portable device.

16. The circuit of claim 15, further comprising a threshold circuit configured to provide the threshold signal.

17. The circuit of claim 16 wherein the threshold circuit is configured to provide adjustment to the threshold signals.

18. The circuit of claim 16 wherein the filtering circuit is adapted to provide adjustment in the filtering of the acceleration circuit output.

19. A circuit, comprising:
a portable circuit having a control circuit; and
a detection circuit adapted to detect user-imparted motion to the portable circuit, comprising:
an input circuit configured to receive an acceleration signal from an acceleration circuit and to generate a filtered acceleration signal;
a first threshold signal circuit configured to store and output a first threshold signal that filters out a DC component that is due to the acceleration of gravity and reset a reference position of the portable circuit and a second threshold signal circuit configured to store and output a second threshold signal;
a first comparator circuit configured to receive the first acceleration signal and the first threshold signal and to output a detection signal indicative of displacement of the portable circuit relative to the reference position and a second comparator circuit configured to receive the first acceleration signal and the second threshold signal and to output a further detection signal;
a hysteresis memory element, the displacement detection circuit further comprising a hysteresis memory element having a first input and a second input; said first comparator stage having an output connected to said first input, and said second comparator stage having an output connected to said second input; and
an enabling circuit configured to receive the detection signal and an external enabling signal and to generate a logic signal in response thereto that is received by the control circuit, which in turn is coupled to a user interface that receives control signals from the control circuit to control operation of the portable circuit in response to the user-imparted motion of the portable circuit.

20. The circuit of claim 19 wherein the enabling circuit is configured to receive the detection signal and the further detection signal and to output a displacement detection signal to the enabling circuit.

21. The circuit of claim 20, further comprising a displacement register to receive an output of the enabling circuit.

22. The circuit of claim 19, further comprising a plurality of input circuits, each configured to receive an external acceleration signal corresponding to a different direction of acceleration, and a plurality of comparator circuits each receiving as input the first threshold signal and a respective acceleration signal from a respective input circuit; and a plurality of enable circuits, each enable circuit configured to receive a detection signal from a respective comparator circuit and to receive a respective external enabling signal and to output a logic signal to enable and disable displacement detection on each of the different directions of acceleration.

23. A circuit, comprising:
a portable circuit having a control circuit; and
a detection circuit adapted to detect user-imparted motion to the portable circuit, comprising:
an input circuit configured to receive an acceleration signal from an acceleration circuit and to generate a filtered acceleration signal;
a first threshold signal circuit configured to store and output a first threshold signal that filters out a DC component that is due to the acceleration of gravity and reset a reference position of the portable circuit and a second threshold signal circuit configured to store and output a second threshold signal;
a first comparator circuit configured to receive the first acceleration signal and the first threshold signal and to output a detection signal indicative of displacement of the portable circuit relative to the reference position and a second comparator circuit configured to receive the first acceleration signal and the second threshold signal and to output a further detection signal;
an enabling circuit configured to receive the detection signal and an external enabling signal and to generate a logic signal in response thereto that is received by the control circuit, which in turn is coupled to a user interface that receives control signals from the control circuit to control operation of the portable circuit in response to the user-imparted motion of the portable circuit; and
a set-reset register configured to receive the detection signal and the further detection signal and to output a displacement detection signal to the enabling circuit.

24. The circuit of claim 23, further comprising a displacement register to receive an output of the enabling circuit.

* * * * *